United States Patent [19]

Andrews

[11] 4,114,717

[45] * Sep. 19, 1978

[54] MOTOR VEHICLE OIL DRIP PAN APPARATUS DEVICE FOR AT LEAST INDIRECTLY SAVING LIVES AND ACCIDENTS ON A HIGHWAY

[76] Inventor: Peter Andrews, 190 Gebhardt Rd., Penfield, N.Y. 14526

[*] Notice: The portion of the term of this patent subsequent to Sep. 14, 1993, has been disclaimed.

[21] Appl. No.: 722,887

[22] Filed: Sep. 13, 1976

Related U.S. Application Data

[60] Continuation-in-part of Ser. No. 467,719, May 7, 1974, Pat. No. 3,980,153, which is a continuation-in-part of Ser. No. 315,174, Dec. 14, 1972, Pat. No. 3,809,175, which is a continuation-in-part of Ser. No. 94,793, Dec. 3, 1970, abandoned, which is a continuation-in-part of Ser. No. 532,831, Feb. 21, 1966, Pat. No. 3,669,204, and Ser. No. 750,094, Aug. 5, 1968, Pat. No. 3,590,937, said Ser. No. 750,094, is a continuation-in-part of Ser. No. 508,625, Oct. 21, 1965, Pat. No. 3,396,810, which is a division of Ser. No. 288,159, Jun. 17, 1963, abandoned.

[51] Int. Cl.$^2$ .............................................. B62D 25/20
[52] U.S. Cl. .................................................. 180/69.1
[58] Field of Search ........................ 180/69.1; 184/106

[56] References Cited

U.S. PATENT DOCUMENTS

| | | | |
|---|---|---|---|
| 2,618,351 | 11/1952 | Giacosa | 180/69.1 |
| 2,783,848 | 3/1957 | Beskid | 180/69.1 |
| 2,841,245 | 7/1958 | Colgan | 180/69.1 X |
| 2,868,329 | 1/1959 | Phelps | 180/69.1 X |
| 2,899,019 | 8/1959 | Colgan | 180/69.1 X |
| 2,931,453 | 4/1960 | Inglese | 180/69.1 |
| 3,980,153 | 9/1976 | Andrews | 180/69.1 |

Primary Examiner—Joseph F. Peters, Jr.
Assistant Examiner—Milton L. Smith

[57] ABSTRACT

A substantially skidpan apparatus device of which at least one portion thereof is hooked and/or removably secured to at least one cross member or to at least one other structural portion of a first type of motor vehicle of the race car, automobile or car, truck and bus type. At least one portion of oil or fluid drippings which have dripped from at least one portion of the above disclosed motor vehicles are retained therein. The apparatus device is also for specific use in a boat type of non-highway used motor vehicle to prevent at least one portion of th inland waters from being oil polluted. The oil or fluid drippings being generally captured and retained in at least one portion of a fluid retaining receptacle portion of the apparatus device and/or at least one portion of a separate material or a nestable receptacle which may be retained in the fluid retaining receptacle portion of the apparatus device. A roadway's, race track's, highway's (car, truck and bus) motor vehicle travelling surface is thereby substantially prevented from "summer icing" of the disclosed motor vehicles traveled surfaces and "viscous hydroplaning" of the motor vehicle's tires thereon, is substantially prevented at and especially when the four first type of motor vehicle's are abruptly started, stopped, curving or curving in and out at a high rate of speed or even merely traveling at a very high rate of speed.

49 Claims, 11 Drawing Figures

MOTOR VEHICLE OIL DRIP PAN APPARATUS DEVICE FOR AT LEAST INDIRECTLY SAVING LIVES AND ACCIDENTS ON A HIGHWAY

This application is a continuation-in-part of my copending application Ser. No. 467,719 filed May 7, 1974 and now U.S. Pat. No. 3,980,153 issued Sept. 14, 1976 which application was a continuation-in-part of my copending application Ser. No. 315,174 filed Dec. 14, 1972 now U.S. Pat. No. 3,809,175 issued May 7, 1974, which was a continuation-in-part of application Ser. No. 94,793 filed Dec. 3, 1970 now abandoned which was a continuation-in-part of copending application Ser. No. 532,831 filed Feb. 21, 1966 now U.S. Pat. No. 3,669,204 issued June 13, 1972, and of application Ser. No. 750,094 filed Aug. 3, 1968 on a (Saturday) thereby given a filing date of Aug. 5, 1968 now U.S. Pat. No. 3,590,937 issued July 6, 1971 and which 750,094 application was a continuation-in-part of application Ser. No. 508,625 application filed Oct. 21, 1965 now U.S. Pat. No. 3,396,810 issued Aug. 13, 1968, which was a divisional of the parent application Ser. No. 288,159 filed June 17, 1963, which is now abandoned.

The terms single element apparatus device or the apparatus or the apparatus device mean the same for the descriptive portion of this specification. The apparatus device relates to and is used in removably secured operative association with a motor vehicle. For example, in one of its embodiments the apparatus device is used in removably secured operative association with at least one first type of motor vehicle, and being a car, race car, truck or bus to prevent the surface or material that is substantially under the above four mentioned motor vehicles from becoming polluted by fluid drippings; from becoming a slimy dangerous slippery surface for the above motor vehicles to travel thereon, especially at a high rate of speed; a disgustful sight; a contaminated or impaired surface by the disclosed fluid drippings which have and are presently dripping from especially the cars, trucks, and buses on at least one highway or roadway or thruway surface.

The oil or fluid leaks and drips from various parts of at least the above mentioned car, truck and bus motor vehicles as, for example, when they are stalled, in an accident, parked, standing, slowly moving and even when they are moving at a high rate of speed on a highway's surface, for example.

Fluid drip receiving receptacles, pans, trampoline, shelf-like, hinged pans and the like devices have previously been constructed and secured or were to be secured to a car, truck and bus type of motor vehicle, to retain the fluid drippings which drips therefrom. However, not one prior art oil or fluid drip pan device was removably secured to and under race cars, cars, trucks, and/or buses, under at least one portion of the internal combustion engine in boats which is a second type of motor vehicle, because all the prior art fluid drip retaining devices were all designed to receive the fluid drippings only when the car, truck or bus motor vehicle was parked in a garage, on a driveway and/or a street. An important fact is that not one prior art device even hints or suggests to prevent oil or fluid drippings on the highways, and especially not on a race track when a race car motor vehicle is in motion, so that at least lives will be saved, accidents prevented and the like as more fully disclosed in the objects of this specification, which objects were also substantially disclosed in my referenced copending applications.

Not one prior art device hints or suggests the use of a fluid drip pan device in a boat to indirectly prevent oil or fluid pollution of the inland waters.

Not one prior art fluid dripping device that I am aware of in whole or in part has even been hooked and removably secured, by at least one bolt or by at least one threaded member and bolt means, a fluid drip retaining receptacle device to at least one or even to at least two cross members of a motor vehicle, to prevent the dripping oil or fluid from being deposited on the race track's or the highway's surface, and at the same time to further thereby also provide a very, very strong and very safe oil or fluid drip retaining skidpan single element type of apparatus device, having a receptacle portion, that cannot be easily torn off by water, air, snow, or even small stones, dirt, sod and the like, for example, when the motor vehicle is in motion on a highway or roadway or even on a rough unpaved roadway.

Not one of the prior art fluid drip retaining devices, that I am aware of suggests, hints or discloses the use of a catalyst, or an oil eating bacteria or even air permeable material or even CAB-O-SIL which is a submicroscopic fire-dry fumed silica material or a silane treated material in a receptacle which is in the receptacle portion of their apparatus or device or even in the receptacle of the apparatus to thereby provide at least one of the condensed objects of this invention, and great utility disclosed in this specification of saving at least lives, preventing accidents, etc., preventing inland water from being further polluted or even just fluid polluted, and the like stated in the objects or condensed objects of this specification.

Three prior art fluid drip retaining patented devices were designed for specifically capturing the dripping oil or fluid in a receptacle portion thereof, when the motor vehicle is parked in a garage or driveway, and then uses the motor vehicle's generated draft of air for ejecting, dumping or discharging and the like of the receptacle's retained oil or fluid directly on the roadway's or highway's surface, and thereby being for the direct opposite to the principal objects of this oil or fluid retaining apparatus device.

The three oil or fluid ejecting, dumping or discharging prior art devices are respectively: W. G. Colgan, Ser. No. 2,841,245 filed May 10, 1956 and issued July 1, 1958; E. I. Phelps Ser. No. 2,868,329 filed July 17, 1956, and issued Jan. 13, 1959; and again W. G. Colgan Ser. No. 2,899,019 filed Nov. 4, 1957, and issued Aug. 11, 1959.

Another prior art oil drip pan device is that of J. Beskid, Ser. No. 2,783,848, filed Aug. 13, 1954, and issued Mar. 5, 1957, and which device was filed before the previously disclosed three oil dumping and/or discharging devices. Beskid forces a cardboard insert, which is over an oil reservoir space 40 in his container or receptacle, against the bottom of the oil pan sump or engine with spring force so that the container will not rattle when the motor vehicle is travelling on a rough road surface. Beskid's device is attached to the underside of a car, truck or bus.

Beskid's oil drip catcher's main object was to catch oil and grease droplets in his cardboard insert 18 and any excess oil and grease will drop into the oil and grease reservoir space 40 which is covered by the cardboard insert 18.

The above first three prior art fluid drip devices are a fluid retaining receptacle device when the motor vehicle is parked and are transformed into a fluid dumping device when the motor vehicle is travelling at a fast rate of speed, for example, on a highway's surface.

The term "fluid" is used in this specification and claims to specifically designate an oil or grease mineral lubricant having hydrocarbons therein as well as non-mineral, and/or even synthetic lubricants that produces a very dangerous, slippery or slimy and polluted surface when dripped or spilled especially on a race track, roadway and/or a highway's surface. The term "fluid" being understood as being "fluid drippings" (fluid which has dripped from at least one portion of the motor vehicle) and which drippings are being substantially retained in the receptacle 3 or 62, or in the receptacle 3 and/or 62.

The following condensed objects of this single element apparatus device, in substantially most of its embodiments, are fully disclosed in applicant's copending parent application Ser. No. 467,719. Thereby some of the fully disclosed objects will not be disclosed in this copending CIP application unless it is otherwise required for a fuller disclosure to a person skilled in the art.

CONDENSED OBJECTS OF MY INVENTION

A condensed version of the objects of this single element apparatus device that are substantially disclosed in the copending Ser. No. 467,719 application are:

1. Saving lives on at least the highways.
2. Preventing accidents and personal injury on at least the highways.
3. Preserving at least one portion of the public's or one's health through at least one less portion of air pollution. 4. Saving money, at least $35.00 to $75.00 for motor vehicle fluid dripping owners.
5. Saving at least one million dollars for the cities, state and federal government combined.
6. Preventing an inside surface of a motor boat from being fluid polluted and also preventing substantially a fire hazard in the bilge of the boat, and further, by even inserting a bilge cleaner and/or a detergent into the receptacle, or even into the material or into a separate receptacle retained in the apparatus' receptacle.
7. Preventing an inside surface of a monorail motor vehicle from being fluid polluted and thereby also fire hazardous.
8. Preventing a race car motor vehicle from being excluded from an important 500 mile race on a race track because of an oil leak or fluid drippings.
9. Preserving friendly relations between the motoring public, neighbors, friends, and delivery truck drivers and owners with customers, which customers do not allow the fluid dripping trucks on their driveways, as in Hollywood, for example.
10. Providing a minimum of expense to the motor vehicle fluid dripping public by buying and mounting at least the apparatus device to the cross members of their motor vehicle by use of at least one available hole, threaded hole and/or bolt means or even by having at least one bolt and nut means on the motor vehicle that is inserted or provided by the motor vehicle manufacturer.
11. Preventing at least one portion of the water of, for example, a river, pond, lake and/or coastal waterways from being fluid polluted as when water and fluid drippings or even an emulsion of water, bilge cleaner or detergent and fluid are pumped or dumped out of a boat and into the water.
12. Provide a substantially skidpan single element apparatus device which in effect, is substantially self-cleaning by having surface water or rain water, which water, in effect, floods at least one portion of the fluid drippings, which are retained in at least one portion of the device, out of the device and thereby be floated on the surface of the rain water to the sides of a highway, for example, where the hydrocarbon consuming bacteria may tend to substantially eat the fluid drippings.

SOME OBJECTS OF MY SINGLE ELEMENT APPARATUS DEVICE

The most important object of my invention is to save lives and prevent accidents on the highways; prevent further pollution of the air we breathe and save money for the government and the public by preventing defective oil seal replacement and less maintenance by merely capturing fluid drippings in at least one receptacle portion of the apparatus and/or even any material retained therein or in at least one portion of a separate nestable receptacle having at least one type of hereafter disclosed material retained therein.

Another principal object of my invention is to generally prevent the motor vehicle travelled roadway's or highway's or even race track's surface, from becoming a "high surface tension surface" towards moisture, water or rain by preventing, for example, the highway and race track type of motor vehicle fluid drippings from substantially being deposited or even spilled, ejected or dumped onto the, for example, highway's surface, and substantially from a fluid retaining receptacle portion of the apparatus, especially when the motor vehicle is abruptly started, stopped, curving or even by the motor vehicle's generated draft of air as when the highway and/or race track first type of motor vehicle is travelling at a very high rate of speed, but more so especially when there is a separate material and/or receptacle retained in the apparatus' receptacle.

And another principal object of my invention is to prevent the roadway's or highway's surface from becoming a very slimy "ice-like" slippery dangerous motor vehicular travelled surface, and especially when moisture or rain floats on at least one portion of the fluid drippings which are on or even baked into the highway's surface.

A still another principal object of my invention is to capture and retain the fluid drippings which are substantially retained in a separate material which is retained in a separate receptacle which is retained in the receptacle portion of the apparatus device for at least preventing further pollution of the air we breathe, saving millions of dollars for the state and federal government combined and yet enable the motor vehicle owner to save money, at least $45.00 to take an automatic transmission apart to replace a, one dollar, fluid leaking seal and at least $95.00 to additionally replace also the rear engine crankshaft fluid seal, and at least $30.00 to $40.00 additionally, for replacing a front crankshaft seal.

Still another important object of my invention is to bring it to the attention of motor vehicle, for example, racing car, car, truck and bus and even a specific second type of motor vehicle such as a boat, for example, manufacturer and city, state and federal authorities, that my apparatus device should become mandatory standard, auxiliary, optional, optional extra or an accessory equipment thereof as are air bags, noise pollution control devices, exhaust pollution control devices, and the like.

And yet a still further object of my invention is to create a minimum of expense for motor vehicle transporting or carrying ferry boat owners through less maintenance in that the motor vehicle's fluid drippings create spots, or even create puddles of fluid, which spots or puddles are substantially prevented on the motor vehicle's parking surfaces.

A yet further object of my invention is to create a minimum of expense for oil or fluid dripping motor vehicle owners by reusing the main supporting receptacle portion of the apparatus, by merely having only a separate material retained in at least one portion of the apparatus' receptacle or having a separate fluid retaining nestable receptacle therein which has a separate fluid absorbent and retaining material retained therein. Accordingly, the material and/or nestable receptacle units will be disposable as a unit, as a whole, when its fluid saturation point has been reached or even exceeded, and even if there is additionally, a catalyst or an oil eating bacteria means for the retained fluid drippings in the nestable material or the nestable receptacle disposable units. Thereby, the apparatus' receptacle portion need not necessarily be fluid impermeable since the separate nestable receptacle will be, accordingly, as desired.

A still yet further object of my invention, whereby a minimum of expense is further made possible for fluid dripping motor vehicle owners is by having the separate material which is foamed directly in the receptacle portion of the apparatus device and foamed even in the separate receptacle portion of the inserted nestable receptacle. Also the separate material may be retained in at least one portion of the nestable receptacle portion of the apparatus, device be cleanable or at least washable and thereby will be reusable, as is also the single element portion of the separate nestable receptacle which is also washable and reusable along with any separate material retained therein, and even if the nestable receptacle's retained material is a fluid absorbent and/or air permeable partitioned material.

A further important object of my invention is to reduce the expense of manufacturing, handling, packaging, shipping and installation of the apparatus device, as a whole, to a motor vehicle manufacturer, by using accessible bolt securing means, accessible bore means, accessible tapped hole means or even having special bore means already provided in at least one portion of a cross member, the under structure and the like of the motor vehicle for at least one portion of at least one supporting ear, bracket or hanger means portion of the apparatus device generally as are, for example, seat belt anchoring bolt insertion bore means, which are generally inserted in the floor structure, or even possible the frame or cross members by motor vehicle manufacturers. Threaded bolts, threaded nuts, threaded plates or stips of metal, lock washers and threaded nut supporting means are known in the art for at least one portion of the apparatus device that may also be welded, supplied or inserted in a portion of the motor vehicle's cross member and thereby be considered as being provided with the motor vehicle, accordingly.

And a yet further object of my invention is to prevent at least one portion of the water of ponds, rivers, lakes, and coastal areas and the like from being polluted by the oil or fluid drippings which are presently dripping from but still being within at least one portion of an inboard motor, of a boat, be it substantially from the oil pan, transmission and the like of the inboard motor, as a whole. Oil or fluid drippings, for example, are generally pumped or washed out of the boat and into the inland waters or a river, pond, lake, and the like for example, and thereby polluting at least one portion of the inland waters. The apparatus device or at least one portion of the apparatus device may be placed or be removably secured, or even be adhesively secured, to at least one portion of the inboard motor's supporting structure or the boat's structure, or any combination thereof, and yet capture at least one portion of the dripping fluid. Also, at least one portion of the apparatus device may be removably secured directly to the inboard motor, motor supports and the like as deemed necessary and/or desired or even be removably secured by at least one bolt means or even at least one bolt means in a tapped hole, or even by at least one bolt and nut means, of the motor vehicle, for example, as desired.

A boat bilge's fire hazard, fluid dripping pollution and the like, is thereby also generally prevented by use of at least one embodiment of the apparatus device in the boat, accordingly, as desired.

These and other objects and advantages will become more apparent in the course of the following description having the accompanying drawing which forms a part thereof.

DETAILED DESCRIPTION OF THE INVENTION

Several embodiments of the apparatus device are substantially shown in FIGS. 1, 3, 8 and 9 and are designated hereafter in portions of in this specification as "the apparatus", or even "apparatus" only to at least save words and space accordingly.

Figure 1:
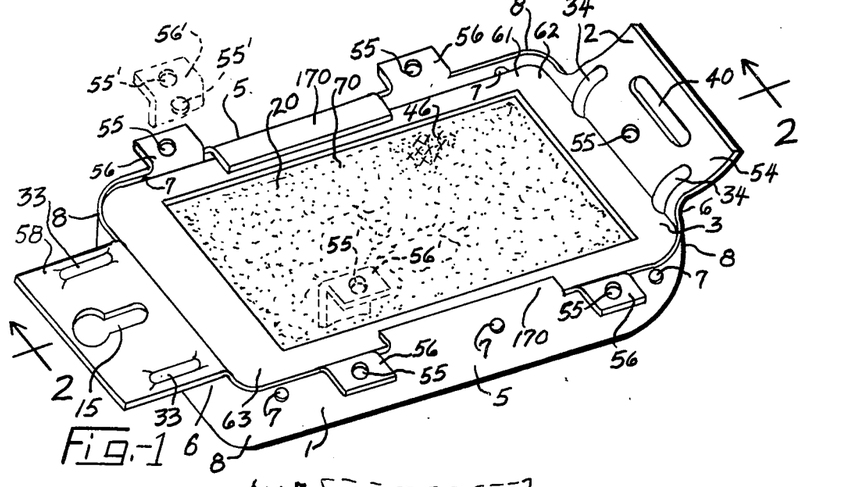
FIG. 1 is an isometric top view of one embodiment of the single element apparatus device having a separate nestable receptacle retained in a receptacle portion of the apparatus device.
Figure 2:
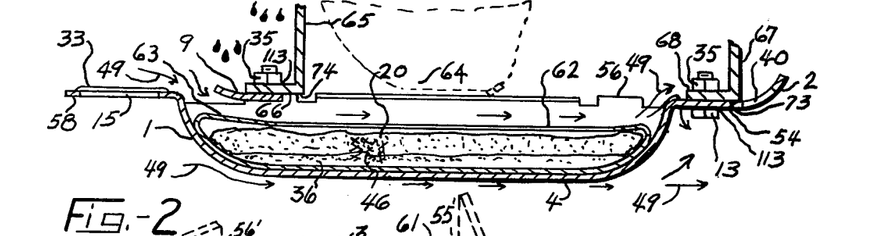
FIG. 2 is a sectional view of the apparatus device taken along sectional line 2—2 of the FIG. 1.

FIG. 1 shows a fluid impermeable trough-like apparatus having a receptacle 3 which has a substantially flat bottom wall 4, as shown in FIG. 2 and integral rectilinear side 5 and end wall 6 portions which merge into corner 8 portions which integrally and fluid impermeably connect the adjacent side 5 and end 6 portions together. The view further shows two of the side walls 5 having at least one integral side ear 56 means having an opening 55 therein. The large bracket 54 has an opening 55 which is used for removably securing the apparatus 1 to the at least one cross member of the frame of the motor vehicle as shown in FIG. 2, for example, and in the copending applications Ser. Nos. 315,174; 94,793 and 750,094 with conventional bolt securing means 13 and nut 35 as desired. Apparatus rigidizing bezel member 170 is also shown.

The apparatus 1 has a separate fluid retaining bezel-like 61 subcombination receptacle 62 nestingly retained therein. The subcombination receptacle 62 has at least one opening 70 in its upper top surface. Material 20 is also shown retained in receptacle 62. The receptacle 62 may have a catalyst means or even a fluid eating bacteria means placed, charged or imbued therein, as well as having Paratac, or even treated or untreated CAB-O-SIL material therein, accordingly, as desired or deemed necessary for maximum retainment of the fluid drippings.

The treated CAB-O-SIL, for example, is Silanox which is a trademark for hydrophobic fumed silicon dioxide from the Cabot Corporation. Silanox provides exceptional water repelency and yet will readily absorb the oil and/or grease drippings of the motor vehicles. Thereby environmental damage, or at least the highway's and race track's motor vehicle used surface, as well as at least some inland waters, for example, of a river, pond, lake and/or even coastal regions are partially prevented from being oil or fluid polluted. The latter waters are prevented from being polluted substantially by boats where the fluid contaminated interior is cleaned, pumped or dumped overboard along with any water and oil cleaning fluids, oil absorbing powders and the like known to persons skilled in the boat or bilge cleaning art, accordingly.

The openings 7 are for insertion of wire (not shown) and the like means for securing the receptacle 62 or material 20 in receptacle 3, as desired, or deemed necessary.

The apparatus 1 and/or the receptacle 62 may also have a foamed material foamed directly therein if so desired, and be integrally bonded therein, as desired, or even adhesively bonded therein as desired.

FIG. 2 shows a sectional view of receptacle 3 taken along sectional line 2—2 of FIG. 1 and also shows the separate nestable subcombination receptacle 62 with material 20 retained therein and/or simplification of the various materials which are disclosed in this specification, the material 20 is to represent any desired one or even substantially all the various materials which are disclosed in this specification, wherein the dripped in oil or fluid can be absorbed or retained. The view shows an integral rear large bracket 54 rigidly secured to an underside 73 portion of a generally centrally located cross member 67 portion of the motor vehicle's frame, for example, by use of at least one punched or drilled or an available opening 113 (not shown) but which opening 113 is under the nut 35 or head of the bolt 13, or accordingly a separate head of a bolt 13 and a nut 35 means. The small side brackets or ears 56, are shown on each side of receptacle 1, as shown rigidly and yet are removably secured to an underside 74 portion of the flange 66 of the forward or front cross member 65, of the motor vehicle's frame, using here also the available or pre-inserted openings 113 and available on at least one portion of at least one of the motor vehicle's cross member 65 and/or 67, bolt means 13 or even by using a separate inserted bolt 13 and nut 35 means accordingly. At least one generally "U" shaped cross member 87 and 89, or the generally "L" shaped 65 and 67 cross members or other shapes of the vehicles frame as cross members, are generally on most of the first type of motor vehicles which are used on the highways and race tracks. The openings 113 disclosed above, for example, could be preinserted by the motor vehicle manufacturer as are, for example, seat belt bolt anchoring openings in the floor of some of the motor vehicles.

It should be noted that the forward end of the receptacle 3 is to be extended, if so desired, or deemed necessary so that the receptacle 3 will catch fluid drippings from the (not shown) front motor shaft seal, and/or the forward cross member 65 portion of a conventional motor vehicle's frame. And also so that a generated draft of air, one process inherent step in a portion of this invention, as is shown by arrow 49 means, will enter over the forward wall portion of receptacle 3, above and through at least one portion of the material 20, over and against at least one portion of the fluid drippings 36 retained therein and then exiting out over at least a rear wall portion of receptacle 3, when the motor vehicle is, for example, used on a highway. At least one outer bottom wall portion 64 of the crankcase oil pan sump should be in spaced relation from at least one upper portion of the material 20 which is retained in receptacle 3 or even in receptacle 62, so that the (not shown) lubricating oil in the oil pan sump 64 will still be indirectly cooled by at least one portion of the generated draft of air which is created when the motor vehicle is in forward drive motion, and especially at high highway or even race track speeds. Thereby, the lubricating oil's temperature is not increased to the point that improper lubrication of the bearings of the crankshaft and the like is created, by breakdown of the lubricating oil film, since one of the lubricating oil's inherent duties or functions of cooling at least one of the motor vehicle's crankshaft, for example, bearings is thereby not obstructed, especially at high or very high motor vehicle highway and/or race track speeds. Also, the rate of, oxidation and thickening of the lubricating oil and its corrosive acid buildup is not increased, in the oil pan sump 64, when the temperature of the oil is maintained at a lower temperature by at least one portion of the motor vehicle's generated draft of air cooling action against the oil pan sump's outer bottom wall. The air cooling is a designed function created by the vehicle manufacturers unless there is an internal cooling of the oil by water piped means from the radiator, as in at least some if not most or all of the present automatic transmissions oil cooling systems. Only then could the bottom of the oil pan sump 64 be abutted or forced against or even be generally imbedded into the material 20. Dripped in fluid or fluid drippings 36 is also shown.

At least one known prior art oil pan sump has its crankcase oil pan sump's bottom wall corrugated or ribbed for indirectly additional air cooling of the lubricating oil therein.

The Catalyst 46 means is used as desired in material 20 and receptacle 3, is also shown in FIGS. 1 and 2.

Figures 3, 4, 5, 6, 7:
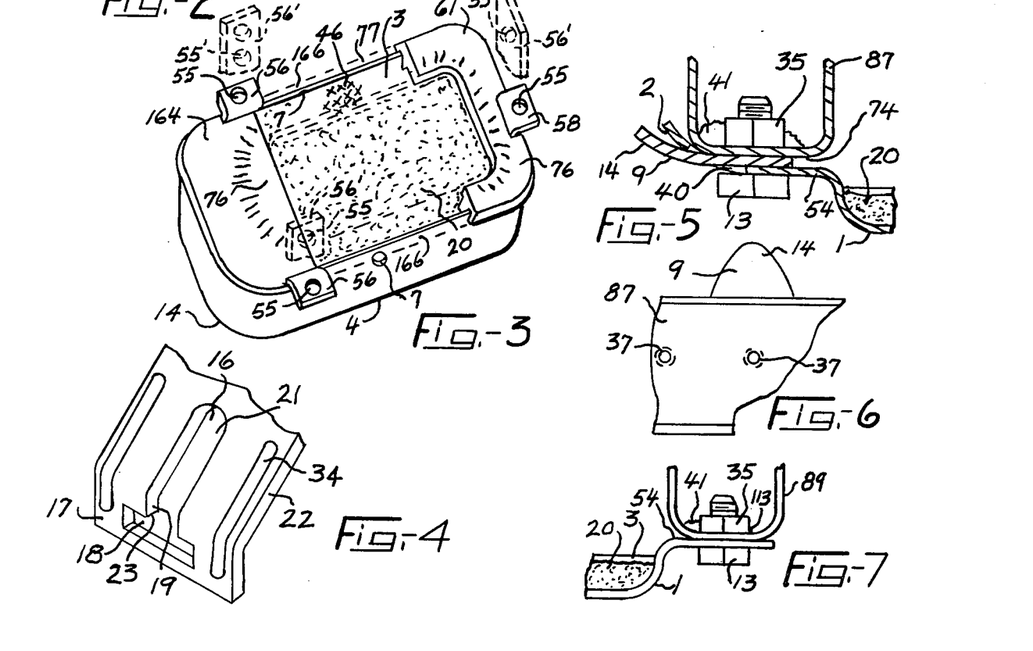
FIG. 3 is an isometric top view of another embodiment of the apparatus device having a separate material retained in the receptacle portion thereof.
FIG. 4 is an alternate form of the rear ear member 58 of FIG. 1 having a tee-shaped opening and a formed down outer end edge portion.
FIG. 5 is an end sectional view of a substantially conventional front cross member having a conventional rigid projection with a portion of an end of the apparatus hooked on one portion of the rigid projection member and also being rigidly and removably secured to the cross member.
FIG. 6 is a top plan sectional view of one portion of the front cross member and showing a generally top view of the rigid projection which may also be integrally formed from a portion of the cross member.
FIG. 7 is a sectional view of a substantially conventionally generally centrally located cross member with a large bracket portion of the apparatus device removably secured thereto by conventional bolt and nut means.

The large rear bracket 54 shown in FIG. 1, may also be removably secured by at least one conventional bolt 13 means or by at least one bolt 13 means and nut 35 means, to the front cross member 65, to its flange 66, to thereby provide still further tear-off proof, greater safety, as is a skidpan or skidplate, and also at the same time prevent undue water flooding of at least one embodiment of the receptacle 3, as desired. Accordingly, the apparatus 1 and its receptacle 3 would, for example, then be removably secured to the cross members 65 and to the flange 68 of the cross member 67, at 180° from that which is shown in FIG. 2. The large 180° rotated, now front bracket 54, as is shown in FIG. 5, may also have its extended forward end 2 edge portion extend upwards and beyond the forward edge portion of flange 66, as desired, so that fluid or oil drippings, shown in tear drop shape in FIG. 2, will be guided into and under the surface 74 of the front cross member 65, or even the front cross member 87, shown in FIG. 5, and substantially into the receptacle 3, as would the oil drippings when they are guided by the surface of bezel 61, by use of its dished down portion 76 which is shown in FIG. 3.

FIG. 1 also shows the large bracket 54 which has a large generally elongated slotted opening 40 which allows the end 2 to be pivotally and tensioningly hooked onto a conventional horn-like projection 9 which is generally welded or is made integral with the cross-member 65 as on some of the motor vehicles, for example, a 1968 and 1969 Pontiac and, for example, the integral part of even a 1976 Cutlass "S" and the like Oldsmobile automobile or car. The extended end 2 is pivotally hooked, under tension, on the projection 9 when the other free downwardly manually supported portion of the apparatus 1 is manually forced upwards, so that the two integral side ears 56 may be rigidly and removably secured by bolt 13 and nut 35 means to the surface 73 of the rear cross member 67 or 89, generally as the two side ears 56 are removably secured to the surface 74 of the front cross member 65, for example, of FIG. 1. Of course, the apparatus 1 would then have to be rotated 180 degrees in order to be hooked and/or be removably secured to the cross members 65 or 87, as above disclosed, regardless of its shape, and as deemed necessary, or as desired, and as shown in FIG. 5, for example. The two side ears 56 may also be hangers or be one longitudinally long side ear 56 with at least two openings 55 therein as desired.

The two openings 55 which are shown in FIG. 1 may also be additionally used in combination with bolt 13 means and nut 35 means and the corresponding openings 113 which are or must be inserted in the front cross members 65 or 87 generally horizontal surface 74 to also prevent any unforseen and undesired rattling as well as thereby creating a very safe hooked and/or removably secured and virtually a tear-off proof apparatus 1, and in fact becoming a very secure and safe skidpan type of fluid drip retaining single element apparatus device 1, as a whole.

The entire end 2 and even the opening 40 is to be eliminated, if so desired, as one embodiment of this specification in order to maintain the original embodiment of the apparatus 1, as it was disclosed in the referenced copending applications Ser. Nos. 315,174; 94,793 and 750,094 which shows the dashed line forward ear in FIG. 1.

The end 2 is also preferred to be hooked under tension on the projection 9 so that the apparatus will not rattle at its forward portion when the car, truck or bus motor vehicle is travelling over a rough, for example, roadway or highway surface.

A large rear ear member 58 is shown with keyhole opening 15 and two side boss-like members 33.

The FIG. 1 apparatus 1 may thereby be hooked to the front cross member 65 or 87, by use of opening 40 and its end 2, and also be removably secured by using only one bolt 13 means and nut 35 at the generally centrally located cross member 67 or 89. The end 2 may be hooked and also rigidly removably secured, by using at least one bolt 13 means and nut 35 means, to the cross members 65 or 87 as desired or deemed necessary.

Another embodiment of the apparatus is created by having the four side ears 56 and any two of the four side ears 56 removably secured to the cross members 65 or 87 and 67 or 89 as desired, whereby the large bracket 54 would not be used or even eliminated.

It is also very desirable to use the large rear bracket 54 which may be removably secured to the rear or generally centrally located cross member 67 or 89 of the motor vehicle's frame. The two front side ears 56 are thereby to be used as desired, as shown in FIG. 2, for removably securing the apparatus 1 to the front cross member 65 of the motor vehicle's frame since this is now also another embodiment of substantially a skidpan or skidplate type of the apparatus 1 and is thereby still a very solid, strong and safe and virtually tear-off proof embodiment portion of the apparatus 1 and at the same time at least indirectly saving lives and preventing accidents on a race track and on the highways, for example, by greatly eliminating the fluid drippings from the highway's and even the race track's dry and/or hot surface.

The large bracket 54 may also be reduced to that of smaller bracket 58 which is shown in FIG. 3 of Ser. No. 467,719 copending parent application, if so desired.

FIG. 3 shows apparatus 1 having a front and rear bezel-like members 61 integrally or cappingly sealed on the top edge of the front and rear walls 6 of receptacle 3 and also partially along the side walls 5 also. The dashed line areas 77 indicates that the bezeled structure 166 may be carried entirely around the top of the walls of receptacle 3, if so desired. It should be noted that when the large forward extending ended bezel 63 or even 164 of the apparatus 1 and/or receptacle 62 shown in FIGS. 2 and 3 is under and extending beyond the forward end of the cross member 65 or 67, then the oil or fluid drippings will still be generally captured and retained in the receptacle 3, material 20 or substantially in the receptacle 62 of FIGS. 2 and 3. And yet the generated draft of air shown by arrow means 49 would be guided and not altogether be blocked off, if so desired, as shown in FIG. 2. The FIG. 3 structure is still very desirable even if the draft of air is blocked off, since proper air cooling of the oil pan sump's bottom wall may still generally be obtained by other paths found by the generated draft of air into receptacle 3, for example, and yet direct front end flooding of the receptacle 3 or receptacle 62, disclosed in FIG. 2 and shown in FIG. 2, and also shown in the apparatus 14 in FIG. 3, by surface water, slush and the like is substantially prevented by the large forward extending end 2 of the apparatus 1 that is shown in FIG. 2 or even by use of the large bezel 63 portion of receptacle 62, as is also the function of the forward extended end 2 of the bracket 54, as is disclosed in FIG. 2 hereabove.

However, it is also very desirable to have at least one embodiment of apparatus 1, wherein its receptacle 3 or even within its receptacle 62, is in effect self-cleaning by use of water flooding means where the surface water, rain water and the like will in fact flood the receptacle 3 material 20 and/or generally the receptacles 62 material 20 to the extent that the fluid drippings 36 are at least partially water-flooded out of the receptacle's 3 material 20 and/or generally the receptacle's 62 material 20. Thereby the flooded out portion of the fluid drippings 36 (shown also in FIG. 4 of copending application Ser. No. 467,719) would float on the top surface of the water to the soil or dirt, along the sides of the highways and be absorbed therein, and further also being at least partially consumed by oil eating or consuming aerobic bacteria which is generally in the soil or dirt along a highway.

The bezel-like portions 61 and 63 shown in FIG. 1 or members 61 and 164 shown in FIG. 3 will help to retain the material 20 in receptacle 3 or 62 respectively and also substantially prevents the fluid drippings 36, should it be therein in excess volume, from substantially being spilled, air ejected, or virtually dumped out of the receptacle 3 and/or 62 when the motor vehicle is out of level; declining; reclining; abruptly starting, stopped or curving at a high rate of speed.

Figure 8:
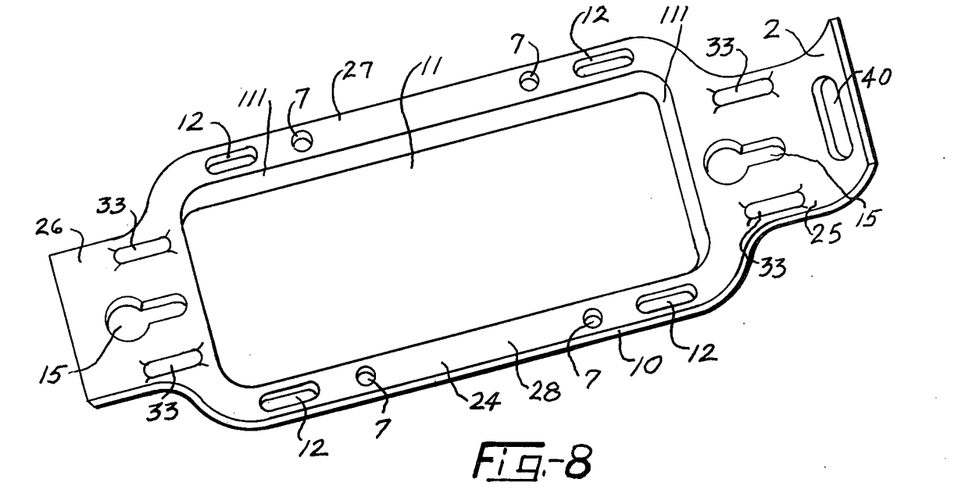
FIG. 8 is an isometric top view of another embodiment of the apparatus device.

When it is raining the water flooding of some of the fluid drippings 36 from the receptacles 3 and 62 and 11 of apparatus device 10 of FIG. 8 will tend to make the receptacles self-cleaning.

The ears or brackets 56, having openings 55 therein, are shown in three places, but they may also be in 4, 5, or 6 places on apparatus 1, as deemed necessary. The holes or openings 55 may also be keyhole or slotted openings therein, if so desired, which slotted 12 openings and/or keyhole 15 openings are shown in FIG. 8, for example. The keyhole openings 15 will removably receive the head portion of the removable securing bolt means 13 (not shown here) in the enlarged portion of the keyhole opening so that the entire threaded portion of bolt means 13 need not be entirely removed from the generally centrally located cross member 67 and/or 89 when the, for example, side ear members 56 are being removably secured substantially to said centrally located cross member 67 and/or 89, for example. Also the dashed outlined ears 56' is a moved or straightened position of ear 56 having a series of holes 55' which will serve to make the apparatus 1 adjustable, as desired, to obtain the proper spaced relationship of the receptacle's 3 material 20 to the lowest bottom wall portion of the oil pan sump 64, substantially as is shown in FIG. 2 and which adjustability of the apparatus 1 or material 20 is generally disclosed in copending application Ser. No. 532,831. The ears 56 may also have opening 55' therein and the ends of the ears 56 may also be straight up, 56' as shown by the dashed lines of FIG. 3 or the top formed over at an angle, as is generally shown in FIG. 1 and with as many adjusting holes 55' therein, as is deemed necessary.

FIG. 3 also shows the dished down portion 76 of the top of bezel-like member 164, material 20, dashed line ears 56 with dashed line opening 55' therein and general shape of ears 56 which may be 56' if extended to the top of ears 56, as shown in dashed line outline in FIG. 1, for example. The vertical length of at least one or at least two ears 56 may also be adjustable in a removably secured vertical overlapping adjacent relationship, for example, by use of at least two vertical ears 56'. That is, by taking the formed over 56' ear as shown in FIG. 1 or even taking ear 56 which is taken with at least one of the straight dashed line ears 56', any desired combination of ears 56 of the adjustable type may thereby be formed or constructed according as desired, or deemed necessary.

FIG. 4 shows an altered rear ear member 58 of FIG. 1 that is numbered 22 having a new and different type of opening which is a "tee-shaped" opening 16, part of which is in a downwardly formed end 17. The so called upper part 18 of the tee-shaped opening 16 and a portion 19 of the long slotted 21 portion of the opening 16 are located in the end 17 so that a safety feature type of substantially a keyhole opening 15 is now possible.

The safety feature is that the head of a threaded or substantially threaded bolt must be loosened at least once or even at least twice the thickness of ear member 22 in order to clear the end 23 of the short portion 19 of the long slotted 21 part of the opening 16. An upwardly formed elongated boss-like portion 34 is also shown, even rigidizing the formed down corner of ear 22, or even one bracket member 54 as is shown in FIG. 1 if so desired.

FIG. 5 cross member 87 is a front cross member 87 as is the front cross member 65, shown in FIG. 2. The cross member 87 has a generally conventional "U" shaped cross sectional shape and is shown with a conventional welded or an integrally formed projection member 9 having an end 14, and which member 9 is welded in some cases to the underside of surface 74 of the front cross member 87. Nut 35 may be welded 41 to inside of member 87.

The extended end 2 of the forward large bracket 54 is shown hooked on the projecting end portion 14 of member 9 by means of opening 40 which is shown in generally elongated shape in FIG. 1. A bolt 13 means and a nut 35 means is also shown for additionally rigidly removably securing the bracket 54 to the cross member 87 surface 74, if so desired, for prevention of possible rattling and greater safety of securing against tear-off and the like, as desired. The apparatus 1 was rotated 180° from that shown in FIG. 2, but the FIG. 5 hooked and secured construction may also be again rotated 180° and be removably secured to the "U" shaped cross members 87 and 89 (see FIG. 7 also) as is apparatus 1 which is shown in FIG. 2.

FIG. 6 shows the shape of end 14 and the generally conventional top view shape of the projecting member 9, by use of apparatus' opening 40 as is generally shown in FIG. 5. Threaded holes 37 may also be used.

FIG. 7 shows a generally conventional and generally centrally located "U" shaped cross member 89 which is located in the same place or takes the place on a motor vehicle frame as the cross member 67 of FIG. 2, for example.

In FIG. 7 the bracket 54 is shown removably secured by at least one bolt 13 and nut 35 means to the rear cross member 89. The bracket 54 is shown without the extended end 2 and opening 40 therein, thereby being as is generally ear 58 which is shown in FIG. 3, whereby the rear ear member 58 of FIG. 3 would be replaced by the large bracket member 54, as is generally shown in FIG. 2, if so desired.

The apparatus' 1 arrangement, shown in FIG. 5, maybe without the bolt 13 and nut 35 means or even a tapped hole 37 in the cross member 87, thereby eliminating the bolt 13 and even the nut 35, as desired. This construction allows a person to hingingly pivot, if necessary, the apparatus 1 slightly downwardly and then slide the end 2 free of the projection end 14 to entirely remove the apparatus 1 from the motor vehicle by merely removing only one or even two bolt means 13 from a rear ear 58 which is also shown in FIG. 3 of Ser. No. 467,719 parent application. The rear bracket 54 may be without end 2 thereon. This arrangement is partially or substantially shown in FIGS. 1, 3, 5 and 7, as a whole, whereby servicing, changing oil and the like of a highway traveled motor vehicle, is simplified if such a very simple arrangement is first deemed desirable but above all safe and substantially tear-off proof under normal winter and/or summer highway motor vehicle travelling conditions.

Welding 41 the nut 35, providing a threaded strip of material having at least one threaded hole therein or even a weld nut 35 inside the cross members 87 and/or 89 is also desirable. The cross members 87 and 89, one or both of them, may also have a substantially tapped hole 37 in at least one portion thereof for receiving the substantially threaded portion of bolt 13 therein whereby nut 35, for example, would be eliminated. Even a one quarter or one half turn substantially threaded detenting type of bolt or even a brake shoe detenting washer and spring means may be used that are of the quick release type as desired, since a, in effect, threading and twisting motion must still be manually employed and thereby still having a removable securing means.

Figure 10:
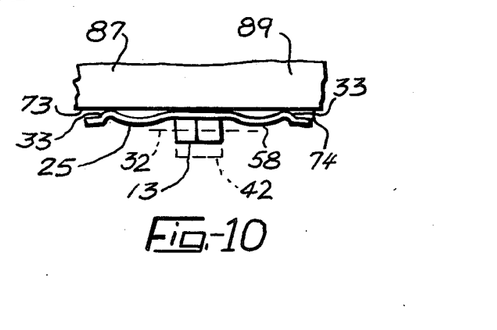
FIG. 10 is an end view of a generally large bracket member which is removably secured to a generally centrally located cross member, of a motor vehicle, to substantially three point contact therewith.

FIG. 8 shows an elongated substantially skidpan single element apparatus device 10 and is substantially polygonal shaped as that which is shown in the FIG. 1 device 1. The device 10 also having a fluid impermeable receptacle 11 portion having an upstanding peripheral wall 111 terminates into an outwardly formed generally peripheral flanged edge 24. The flanged edge 24 has an integral generally large bracket member 25 which has an elongated keyhole opening 15 and two upwardly coined boss-like members 33. When the bracket member 25 is removably secured to a, for example, front cross member 65 or 87, or even a generally centrally located cross member 67 or 89 by a bolt means 13 then the bracket member 25 is removably secured substantially at three places to the underside of the, for example, centrally located cross member 89 as is generally shown in FIG. 10. FIG. 10 also applies to the ear member 58 of FIG. 1 when it is removably secured to a cross member 89 by use of only one bolt 13 means.

The above also applies to the ear member 26 having keyhole opening 15 and two upwardly coined boss-like members 33. Thereby the device 10 is substantially removably secured in substantially three places by use of only one bolt 13 means and in substantially 6 places to the underside of for example, two cross members 87 and 89 of a motor vehicle with only 2 bolt securing means. Elongated slots or openings 12 are also shown in the outwardly formed substantially side ear members or sides 27 and 28 of the peripheral flanged edge 24 that is inpart, and in effect, outwardly formed longitudinally long side ear members 56. The openings 12 are for receiving bolt 13 removable securing means in the event that it is desired to use two or all four slots 12 for removably securing the device 10 to for example, a cross member 87 and a cross member 89 or in any combination with the large bracket member 25 and/or ear member 26. Elongated openings 12 will removably receive therein a shank portion of bolt 13 means even if the distances between a front cross member 65 or 87 and a generally centrally located cross member 67 or 89 should vary. Accordingly one or both members 25 and 26 would be eliminated as desired, depending upon the embodiment that is preferred for a particular arrangement that is under a disclosed first type of motor vehicle.

Figure 9:
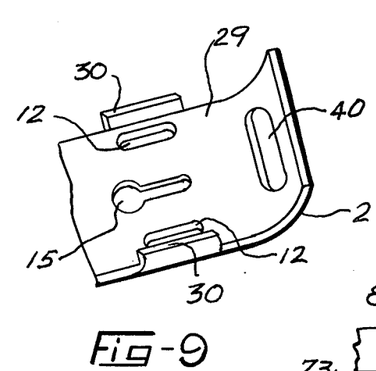
FIG. 9 is a partial isometric top view of a generally large bracket member which hooks onto a front crossmember projection.
Figure 11:
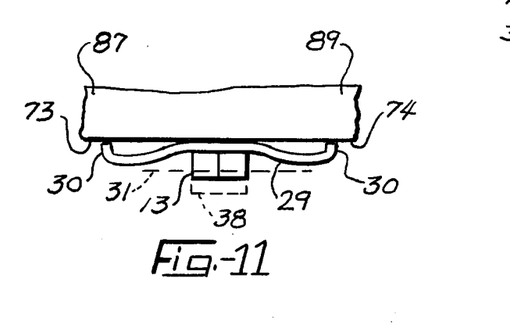
FIG. 11 is an end view of still another form of a generally large bracket member which is removably secured to a generally centrally located cross member to substantially three places thereof with one bolt means.

FIG. 9 is a generally large bracket member 29 which may be used in place of bracket member 25 of FIG. 8 or bracket member 54 as shown in FIG. 1 as desired or deemed necessary. Bracket member 29 has an elongated opening 40, a keyhole opening 15 and two slotted openings 12 for receiving bolt means 13 therein as desired or deemed necessary for additionally removably securing the member 29 to for example, a cross member 87 or 89. Two upwardly formed side portions 30 are shown so that, as desired or deemed necessary, member 29 will be removably secured to a cross member, for example, 87 or 89 as is generally shown in FIG. 11, to generally three places of a generally underside outer wall portion of a cross member with only one bolt means 13. Any desired portion of member 29 may also be eliminated, depending on the preferred embodiment thereof when hooking only, or removably securing only, or hooking and removably securing only, according to the particular arrangement of the for example, cross members 87 and 89 of a disclosed first type of motor vehicle.

FIGS. 10 and 11 are self-explanatory when taken with the above disclosure as a whole or in-part thereof.

The term "summer icing" used in this specification is generally derived from the fact that light rain or drizzle, especially after a dry spell in the summer, produces a thin greasy film on the road surface, which is almost as slippery as ice. That is, especially during the first 15 to 30 minutes after it starts to rain and up to an hour or more in light drizzle. The deposited drizzle or rain at first tends to float on the high surface tension of, the roadway's or highway's surface which has the greasy film of oil or fluid drippings 36 or additionally the centrifugally thrown out oil or fluid from motor vehicles generally thereon. Some of the fluid drippings 36 are even absorbed, baked into and the like, on the highway's surface before it rains.

The term "viscous hydroplaning" is one which may even be more dangerous than "dynamic hydroplaning" which is generally on the surface of the rain or deposited rain water. Viscous hydroplaning may occur on a seemingly dry motor vehicle travelled highway surface, for example. The seemingly dry surface is no more than a heavy dew mingling with oil or fluid and dust, on a well travelled highway, that will create a greasy film of moisture that may be microscopically thin, but is sufficient to prevent tires from penetrating the greasy film and thereby not finding safe traction.

It is also a fact that the state and federal government is presently cleaning the motor vehicle travelled surfaces with surface scrubbing machines, surface cleaning machines or cleaning with detergents, soaps, and the like. The state alone is presently paying thousands of dollars to clean the thruway areas and especially the toll collecting areas and thereby at least one million dollars is saved for all concerned by use of substantially at least one embodiment of the substantially skidpan single element apparatus device, disclosed in this specification.

The fluid retaining receptacles 3 and 62 disclosed in this specification may also be fluid permeable or fluid impermeable, accordingly as desired or deemed necessary. The receptacle 62 may be made of metal, plastic or as are new milk cartons made of paper or paperboard, and coated with polyethylene, especially the bezel-like 61 receptacle 62 shown in FIG. 1, for example, that could also be made to be a disposable unit along with material 20 therein. The disclosed fluid 36 retaining material 20 may also be accordingly inserted into material 6, 117, 118, 119, 120, or 121 and/or any combination thereof that is desired or deemed necessary and is thereby still material 20, as a whole.

The latter 6 materials are disclosed, for example, in my copending application Ser. No. 532,831.

The receptacle 62 may also have an open cell foam material 20 foamed therein if so desired, or even a steel wool material 20. Loose or bonded fibers or hair, and the like and with oil resistant, elastomer or plastic material as a binder, are all also to be used as being material 20, and especially a material 20 having or a material therein that is treated with Silanox.

The term "material 20" or even "material means" will substantially designate all or any desired combination of the substances and materials disclosed and/or referenced in this specification, treated and/or untreated with Silanox, as desired.

In this time period of every increasing vehicular drive and high-speed travelling, an ever increasing amount of vehicles was estimated 158,000,000 to be on the highways, thruways, freeways, turnpikes, streets, roads and the like, by 1980. This is an indicator to provide safer, cleaner and uncontaminated highway surfaces on which all persons in highway traveled motor vehicles must travel, and this is the basis for at least the shown and disclosed embodiments of the substantially skidpan single element very needed apparatus device.

The polygonal, rectangular, troughy, or other polygonal configurations of the receptacle 3 and/or 62 shape and the like are and will be apparent to those skilled in the art, as well as the shape of the cross members 65, 67, 87 and/or 89, once this invention is disclosed as to its importance and need thereof, by at least the highway and race track motor vehicle public as mentioned in the foregoing specification and/or objects. The apparatus' 1 receptacle 3 and/or the separate receptacle 62 are to have square, rounding, sharp, blunt and the like shaped corners which merge the substantially rectilinear, curvilinear or other suitable band-like portions thereof into a fluid impermeable structure, as desired, by forming, coining, welding and the like, for forming a fluid retaining and impermeable receptacle 3 of apparatus 1.

The foregoing description and the drawings are given merely to explain and illustrate the substantially skidpan single element apparatus device invention and other possible combination apparatus device inventions, are also shown accordingly, and thereby the disclosed inventions, as a whole, are not to be limited thereto, except insofar as the appended claims are so limited.

While several embodiments of the substantially skidpan single element apparatus device have been disclosed, it is understood that the inventive idea may be carried out in a number of ways, especially the front end of the single element apparatus device's hooking onto ways to a first type of motor vehicle's understructure, cross member and the like. The above disclosed single element apparatus device is, therefore, not limited to the precise details described, but it is intended to cover all variations and modifications falling within the scope of the appended claims.

I claim:

1. A substantially skidpan single element apparatus device which is used in operative association with a first type of motor vehicle for retaining fluid drippings which drip from said motor vehicle having a front cross member having an integrally extending horn-like projection and a generally centrally located cross member comprising: a substantially skidpan fluid retaining and fluid impermeable receptacle having two outwardly formed integral side ear members with one of said side ear members generally extending at an angle from each of two upper substantially rectilinear side wall portions thereof and also having one integrally outwardly formed large bracket member having an opening and extending outwardly from one upper integral rectilinear end wall portion of said receptacle so that when said apparatus device is to be removably secured to said motor vehicle said side ear members are removably secured to said centrally located cross member by a removable securing means while said bracket member is hooked over and onto said horn-like projection by use of said opening in said bracket member for also suspendingly and hookingly disposing said receptacle under at least one portion of said vehicle and for receiving and substantially retaining fluid drippings which dripped substantially into said receptacle from at least one underpart portion of said vehicle; said receptacle having a bottom wall and two integral substantially rectilinear side wall portions and two integral substantially rectilinear end wall portions that merge integrally at four corner portions and having said side ear members and said bracket member extending integrally from said side wall portions and said end wall portion respectively.

2. The apparatus device as set forth in claim 1 wherein said side ear members each having at least one opening for removably receiving one portion of said securing means in at least one opening in said side ear members.

3. The apparatus device as set forth in claim 1 wherein said opening in said large bracket member is a large opening.

4. The apparatus device as set forth in claim 1 wherein said opening in said large bracket member is a large generally elongated opening.

5. The apparatus device as set forth in claim 1 wherein said large bracket member having at least one portion of an outer side edge formed upwardly at an angle so that said bracket member will be hooked onto said horn-like projection under tension due to the engagement of at least one portion of said formed upwardly said outer side edge against an underside portion of said front cross member and so that said apparatus device will not tend to rattle against said front cross member; said side ear members each having at least one opening for removably receiving one portion of said securing means in at least one opening in said side ear members.

6. The apparatus device as set forth in claim 5 wherein at least one portion of both outer side edges of said large bracket member being formed upwardly at an angle so that said large bracket member will not tend to rattle against said front cross member and so that said large bracket member is hooked under tension onto said horn-like projection especially when said side ear members are removably secured to said centrally located cross member by one portion of said securing means.

7. The apparatus device as set forth in claim 1 wherein said side ear members each having an elongated opening for removably receiving one portion of said removable securing means therein.

8. The apparatus device as set forth in claim 1 wherein each of said side ear members having a keyhole shaped opening for removably receiving one portion of said removable securing means therein so that said removable securing means need not be entirely removed substantially from said located cross member when said side ear members are to be either removably released or removably secured substantially to said centrally located cross member.

9. The apparatus device as set forth in claim 1 wherein said bracket having at least one other opening for receiving one portion of a removable securing means therein so that said bracket will not rattle and to provide a more rigid and safer removably secured and hooked said apparatus device.

10. The apparatus device as set forth in claim 1 wherein said bracket is hooked under tension onto said horn-like member when said side ear members are rigidly removably secured to said centrally located cross member.

11. The apparatus device as set forth in claim 1 wherein said two said side wall portions each having at least one upper portion thereof inwardly formed for creating greater elongated rigidity to said apparatus device.

12. The apparatus device as set forth in claim 1 wherein said side wall portions each having at least one upper portion thereof outwardly formed for creating greater elongated rigidity to said apparatus device.

13. A substantially skidpan single element apparatus device which is used in operative association with a first type of motor vehicle for retaining fluid drippings which drip from said motor vehicle having a front cross member and a generally centrally located cross member comprising: an elongated open topped fluid retaining and impermeable substantially skidpan receptacle having two integral side ear members with one of said side ear members extending outwardly from an upper portion of each two integral substantially rectilinear side wall portions thereof and also having one integral large bracket member extending outwardly from one upper integral substantially rectilinear end wall portion of said receptacle and when said apparatus device is being removably secured to said front cross member and said centrally located cross member said side ear members are removably secured to said front cross member and said bracket member is removably secured to said centrally located cross member by use of a removable securing means for suspending and disposing said receptacle under at least one portion of said vehicle and for receiving and substantially retaining fluid drippings which have dripped substantially into said receptacle from at least one underpart portion of said vehicle; said receptacle having a bottom wall and two integral substantially rectilinear side wall portions and two integral substantially rectilinear end wall portions that merge integrally and fluid impermeably at four corner portions thereof and having said side ear members and said bracket member extending integrally from said side wall portions and one of said end wall portions respectively; said ear members and said bracket member each having at least one opening for removably receiving one portion of said removable securing means in at least one opening thereof; said receptacle will tend to be self-cleaning of at least one portion of said fluid drippings by rain water flooding means when said apparatus device is removably secured to said motor vehicle and when said vehicle is travelling over a rain water surface at a substantially high rate of speed.

14. The apparatus device as set forth in claim 13 wherein said bracket having at least two openings for removably receiving one portion of said securing means in at least one of the openings in said bracket for removably securing said bracket to said cross member.

15. The apparatus device as set forth in claim 13 wherein said two said side wall portions each having at least one upper portion thereof inwardly formed for creating greater elongated rigidity to said apparatus device.

16. A substantially skidpan single element apparatus device which is used in removably secured operative association with a first type of motor vehicle for retaining fluid drippings which drip from said motor vehicle having a front cross member and a generally centrally located cross member comprising: a substantially skidpan open topped fluid retaining and fluid impermeable receptacle having two integral outwardly formed side ear members with one of said side ear members extending from an upper portion of each of two rectilinear side wall portions of said receptacle and also having one integral outwardly formed large bracket member extending outwardly from one upper integral substantially rectilinear end wall portion of said receptacle and when said apparatus device is to be removably secured to said vehicle said large bracket member is removably secured to said front cross member and said side ear members are removably secured to said centrally located cross member by use of a removable securing means for suspending and disposing said receptacle under at least one portion of said vehicle and for receiving and substantially retaining fluid drippings which have dripped substantially into said receptacle from at least one underpart portion of said motor vehicle; said receptacle having a bottom wall and two integral rectilinear side wall portions and two integral rectilinear end wall portions that merge integrally and fluid impermeably at four corner portions thereof; said ear members and said bracket member each having at least one opening for removably receiving one portion of said removable securing means in at least one of the openings in said bracket member and said ear members; said receptacle will tend to be self-cleaning of at least one portion of said fluid drippings by rain water flooding means when said motor vehicle is travelling at a substantially high rate of speed over a rain water surface.

17. The apparatus device as set forth in claim 16 wherein said bracket member having an extended dished down center portion that is at an upward angle and extending at least one quarter of an inch beyond a lowest forward outer longitudinal surface portion of said front cross member for substantially guiding fluid drippings under said cross member and substantially into said receptacle by use of said dished down center portion.

18. The apparatus device as set forth in claim 16 wherein said bracket having a second opening therein for removably hooking said bracket on an integral projection of said front cross member.

19. The apparatus device as set forth in claim 16 wherein said side wall portions of said receptacle each having at least one upper portion thereof inwardly formed for creating greater elongated rigidity to said apparatus device.

20. The apparatus device as set forth in claim 16 wherein said side ear members are longitudinally long said side ear members for creating greater elongated rigidity to said apparatus device.

21. A substantially skidpan single element apparatus device which is used in operative association with a first type of motor vehicle for retaining fluid drippings which drip from said motor vehicle having a front cross member which has an integrally extending horn-like projection and a generally centrally located cross member which is rearward of said front cross member comprising: a substantially skidpan integral one-piece elongated open topped receptacle having two outwardly formed integral side ear members having at least one opening therein with one of said side ear members extending from each of two upper substantially rectilinear side wall portions thereof and also having one integrally outwardly formed large bracket member having an opening therein and extending outwardly from one upper integral substantially rectilinear end wall portion of said receptacle and when said apparatus device is to be removably secured to said vehicle said side ear members to be removably secured to said centrally located cross member by use of a removable securing means; said ear members having said opening for removably receiving one portion of said removable securing means therein while said bracket member is already threadingly hooked onto said horn-like projection by use of said opening in said bracket member for suspendingly removably securing and hookingly disposing said receptacle under at least one portion of said motor vehicle and for receiving and substantially retaining fluid drippings which drip substantially into said receptacle from at least one underpart portion of said motor vehicle; said receptacle having a bottom wall and two integral substantially rectilinear side wall portions and two integral substantially rectilinear end wall portions that merge integrally into four corner portions thereof and having said side ear members and said bracket member extending integrally from said side wall portions and said end wall portion; said apparatus device is so constructed and arranged that when it is removably hooked and secured to said front cross member and said centrally located rear cross member respectively, then said apparatus device is very safe to use even at very high highway and/or race track speeds in that it is also a virtually tear-off proof substantially skidpan said apparatus device.

22. The apparatus device as set forth in claim 21 wherein said removable securing means is a rigidly removable securing means for rigidly releasably securing said ear members to said centrally located cross member.

23. The apparatus device as set forth in claim 21 wherein said two said side wall portions each having at least one upper portion thereof inwardly formed for creating greater elongated rigidity to said apparatus device.

24. The apparatus device as set forth in claim 21 wherein said bracket member having at least one other opening therein for removably receiving one portion of a removable securing means for removably securing said bracket to said front cross member so that said bracket will not tend to rattle when said vehicle is travelling over a rough surface.

25. The apparatus device as set forth in claim 21 wherein said side wall portions of said receptacle each having an upper portion thereof outwardly formed for creating a longitudinally long said ear member and greater elongated rigidity to said apparatus device.

26. A substantially skidpan single element apparatus device which is used in operative association with a first type of motor vehicle for retaining fluid drippings which drip from said motor vehicle having a front cross member having an integrally extending projection and a generally centrally located cross member comprising: a substantially skidpan fluid retaining and fluid impermeable receptacle having one outwardly formed integral ear member which extends at an angle from a first substantially rectilinear end wall portion of said receptacle; said receptacle also having one integrally outwardly formed large bracket member having an opening and extending outwardly from a second upper integral substantially rectilinear end wall portion of said receptacle and when said apparatus device is to be hooked and removably secured to said motor vehicle said ear member is removably secured to said centrally located cross member by use of a removable securing means while said bracket member is substantially threadingly hooked over and onto said projection by use of said opening in said bracket member for hookingly disposing and suspendingly removably securing said receptacle under at least one portion of said motor vehicle and for receiving and substantially retaining fluid drippings which dripped substantially into said receptacle from at least one underpart portion of said motor vehicle; said receptacle having a bottom wall and two integral rectilinear side wall portions and said first and second rectilinear end wall portion that merge integrally at four corner portions of said receptacle; said ear member having at least one opening for removably receiving one portion of said removable securing means in at least one opening in said ear member.

27. The apparatus device as set forth in claim 26 wherein said side wall portions each having at least one upper portion thereof inwardly formed for creating greater elongated rigidity to said apparatus device.

28. The apparatus device as set forth in claim 26 wherein said large bracket member having at least one other opening therein; said other opening being for receiving one portion of a removable securing means which removably secures said bracket member to said front cross member and so that said bracket member will not rattle against said front cross member.

29. The apparatus device as set forth in claim 26 wherein said side wall portions each having at least one upper portion thereof outwardly formed for creating greater elongated rigidity to said apparatus device and at the same time enlarging at least one portion of the fluid drip catching area of said apparatus device.

30. The apparatus device as set forth in claim 26 wherein said ear member having at least one substantially side portion thereof formed upwardly towards said located cross member for creating a substantially three point contact of said ear member with substantially three surface portions of said located cross member so that said ear member will not rattle against said located cross member and so that at least one portion of said ear member is removably secured under substantially spring-like tension when said member is removably secured to said located cross member by use of only one said securing means.

31. The apparatus device as set forth in claim 26 wherein said opening in said ear member is an elongated opening.

32. The apparatus device as set forth in claim 26 wherein said opening in said ear member is a keyhole shaped opening so that said ear member may be repeatedly removably secured to said located cross member without complete removal of said securing means substantially from said located cross member.

33. The apparatus device as set forth in claim 26 wherein said ear member having at least one substantially side portion thereof with a raised upwardly coined boss-like portion towards said located cross member for creating a substantially three point surface contact of said ear member with substantially three surface portions of said located cross member so that said ear member will not tend to rattle against said located cross member and so that flatness and longitudinal twisting of said apparatus device is controlled when said device is removably secured to said located cross member by use of only one said removable securing means, especially when said vehicle is travelling at a high rate of speed.

34. The apparatus device as set forth in claim 33 wherein said opening in said ear member is a keyhole shaped opening so that said ear member may be repeatedly removably secured to said located cross member without complete removal of said securing means substantially from said located cross member.

35. The apparatus device as set forth in claim 26 wherein said opening in said large bracket member is a generally large opening.

36. The apparatus device as set forth in claim 26 wherein said opening in said large bracket member is a large generally elongated opening.

37. The apparatus device as set forth in claim 26 wherein said opening in said ear member is an elongated generally tee-shaped opening.

38. A substantially skidpan single element apparatus device which is used in removably secured operative association with a first type of motor vehicle for retaining fluid drippings which drip from said motor vehicle having a front cross member and a generally centrally located cross member comprising: a substantially skidpan fluid retaining and fluid impermeable and substantially self-cleaning receptacle having one outwardly formed integral ear member having an opening for receiving one portion of a removable securing means therein; said ear member extends at an angle from a first substantially rectilinear end wall portion of said receptacle; said receptacle also having one integrally outwardly formed large bracket member having an opening for receiving one portion of a removable securing means therein; said large bracket extending outwardly from a second upper integral substantially rectilinear end wall portion of said receptacle and when said apparatus device is to be removably secured to said motor vehicle said ear member by use of said opening therein is removably secured to said centrally located cross member by use of said removable securing means and said bracket member is removably secured to said front cross member by use of said opening therein and said removable securing means for disposingly and suspendingly removably securing said apparatus device under at least one portion of said front and said centrally located cross members for receiving and substantially retaining fluid drippings which dripped substantially into said receptacle from at least one underpart portion of said motor vehicle; and receptacle will tend to be self-cleaning of at least one portion of said fluid drippings by rain water flooding means when said vehicle is travelling over a rain water surface at a high rate of speed; said receptacle having a bottom wall and two integral substantially rectilinear side wall portions and said first and second substantially rectilinear end wall portion that merge integrally at four corner portions of said receptacle; said apparatus device is so constructed and arranged that when it is removably secured to said front cross member and said located cross member, then it is very safe to use even at very high highway and/or race track speeds in that it is also a virtually tear-off proof substantially skidpan said apparatus device.

39. The apparatus device as set forth in claim 38 wherein said opening in said ear member and said bracket member is keyhole shaped.

40. The apparatus device as set forth in claim 39 wherein said side wall portions each having at least one upper portion thereof inwardly formed for creating greater elongated rigidity to said apparatus device.

41. The apparatus device as set forth in claim 38 wherein said large bracket member having a second opening therein for also removably hooking said bracket member on a projection of said front cross member.

42. The apparatus device as set forth in claim 41 wherein said side wall portions each having at least one upper portion thereof inwardly formed for creating greater elongated rigidity to said apparatus device.

43. The apparatus device as set forth in claim 38 wherein said ear member and said large bracket member each having an upwardly coined boss-like portion on at least one side portion thereof so that said ear member and said bracket member will each be substantially removably secured, by use of only one removable securing means, at generally three places and under tension to a surface portion of said front and said located cross members and so that longitudinal twisting and flatness of said apparatus device to a race track and a highway surface is controlled, even at high motor vehicle speeds on a highway and a race track.

44. The apparatus device as set forth in claim 43 wherein said side wall portions each having at least one upper portion thereof outwardly formed for creating greater elongated rigidity to said apparatus device.

45. The apparatus device as set forth in claim 43 wherein said ear member and said large bracket member each having two upwardly coined boss-like portions substantially along each outer side edge portion thereof with said opening in said ear member and said bracket member being substantially between said two upwardly coined boss-like portions so that said twisting and tension flatness of said device generally to a highway and race track surface is better controlled even at high motor vehicle speeds on a highway and race track.

46. The apparatus device as set forth in claim 45 wherein said side wall portions each having at least one upper portion of each of said side wall portions inwardly formed for creating greater elongated rigidity to said apparatus device.

47. The apparatus device as set forth in claim 45 wherein said side wall portions each having at least one upper portion thereof outwardly formed for creating greater elongated rigidity to said apparatus device.

48. The apparatus device as set forth in claim 38 wherein said side wall portions of said receptacle each having at least one upper portion thereof inwardly formed for creating greater elongated rigidity to said apparatus device.

49. The apparatus device as set forth in claim 38 wherein said two said side wall portions each having the upper portion thereof outwardly formed for creating greater elongated rigidity to said apparatus device.

* * * * *